March 1, 1938. J. W. GOBLE 2,109,694
MILK COOLER
Filed Dec. 3, 1936
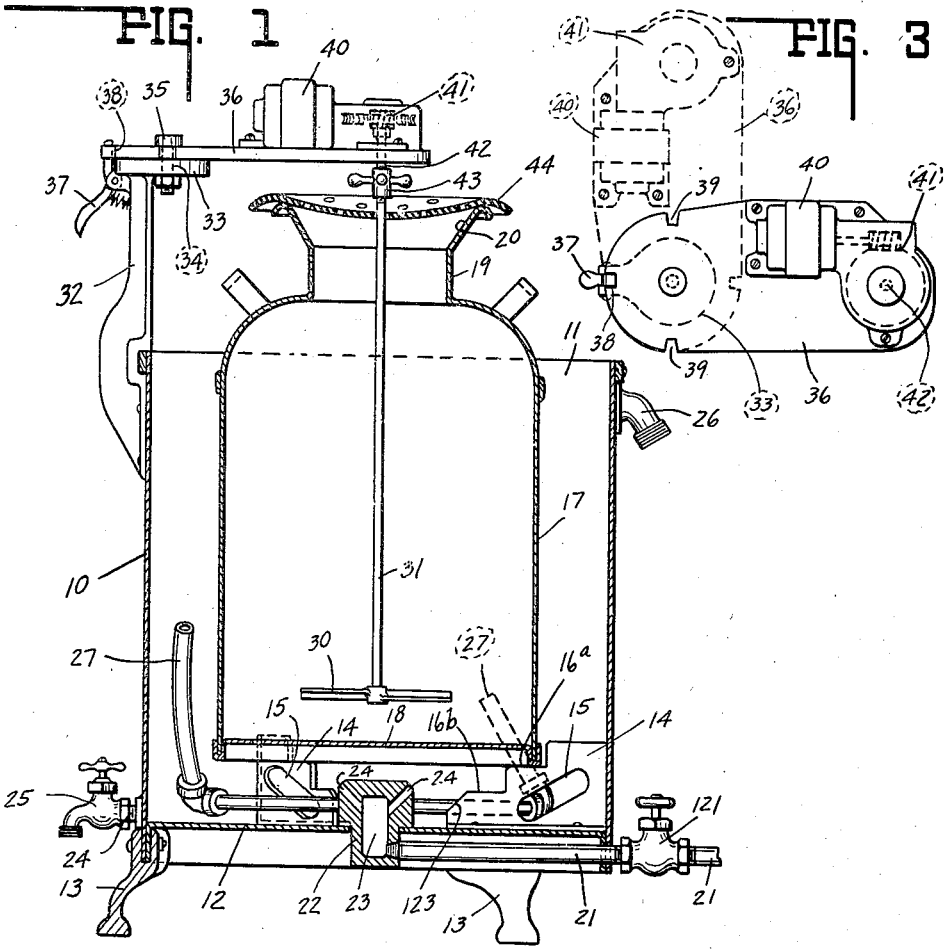
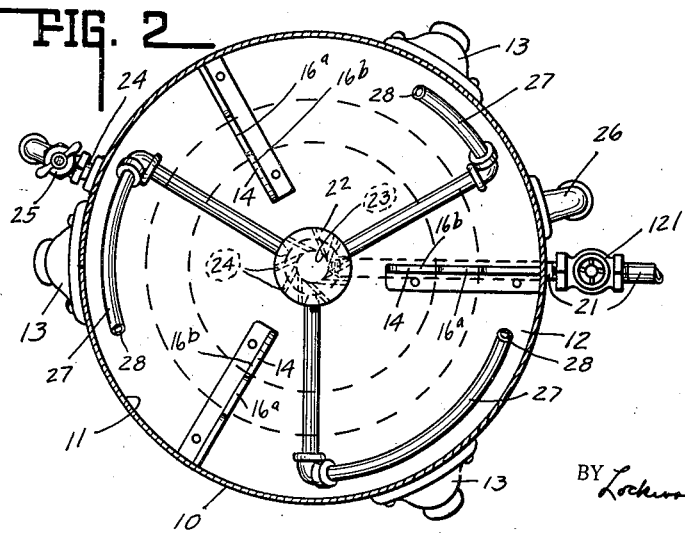
INVENTOR.
JOHN W. GOBLE.
BY Lockwood Goldsmith & Galt
ATTORNEYS.

Patented Mar. 1, 1938

2,109,694

UNITED STATES PATENT OFFICE 2,109,694

MILK COOLER

John W. Goble, Gosport, Ind.

Application December 3, 1936, Serial No. 114,007

8 Claims. (Cl. 257—108)

This invention relates to a milk cooling device.

The chief object of this invention is to cool milk expeditiously and with a minimum use of cooling medium.

The chief feature of the invention consists in applying the cooling medium to the milk container surface to insure the rapid removal of heat from the milk in the container, such heat transference being further accelerated by agitation of the milk.

Another object of the invention is to provide a milk cooling device which is not only exceedingly simple in construction, but which is adapted to receive and relatively fixedly support, and accommodate interchangeably without adjustment, the three standard sizes of standard milk cans.

Other objects and features will appear more fully hereinafter from the detailed description.

The full nature of the invention will be understood from the accompanying drawing and the following description and claims:

In the drawing, Fig. 1 is a central sectional view of the device with a milk can therein, the milk agitating power portion being shown in elevation.

Fig. 2 is a transverse sectional view of the can support and can bottom spray arrangement in the device.

Fig. 3 is a top plan view of the milk agitator power device support in can registering position, dotted lines indicating an inoperative position thereof.

In the drawing 10 indicates a container of suitable transverse sectional outline, and preferably circular, and of suitable height, having an open top 11 and a bottom 12. Standards or legs 13 may support the same. Suitably secured within the cooling chamber thus provided and suitably anchored to the lower portion of the wall 10 and/or the bottom 12, are a plurality of milk can supporting members 14 in the form of vanes or blades. Herein three are shown arranged in spaced relation and apertured as at 15 to permit free circulation of water in the bottom of the container. Each vane includes a plurality of shoulders 16a and 16b in stepped relation.

Suitably supported in corresponding shoulders of the several vanes, is a standard milk can 17 having the usual bottom 18, the neck 19 and mouth 20.

The five and eight gallon cans have the same height, while the ten gallon can is taller. The eight and ten gallon cans have the same diameter. The relative height of the container receiving the milk can is such that flooding of the five and eight gallon cans will not occur and the relative height is such that substantially the major portion of the eight and ten gallon cans is positioned within the container for milk cooling.

The transverse or vertical portions of the support members 14 adjacent the shoulders prevent lateral displacement of the milk can and thus protect the mechanism interposed between the can and the inner wall of the container from damage. Also the stepped support arrangement insures relatively exact positioning of the milk can within the cooler device so that the mechanisms, hereinafter described, in all instances of operation, secures substantially identical results for cans of the different capacities.

A suitable source of water pressure is connected to a supply line 21 controlled by a valve 121. Such connection may be of fixed or flexible character, as desired. The conduit 21 communicates with a distributing head structure 22 positioned immediately adjacent the bottom 12 of the cooler or container and it is suitably secured thereto.

The head structure includes a chamber 23 therein and a plurality of ports 24 for an axis directed upwardly and outwardly at approximately 45°. These ports or passages instead of being exactly radial are directed at a relatively small angle thereto as between 10° and 20°.

Water under pressure issuing from these ports, therefore, is directed upwardly, outwardly and at an angle to radial planes which tend to create a swirling or circular spray upon the bottom 18 of the milk can positioned adjacent thereto. To prevent eddy currents and to insure the aforesaid circulating or circular action of the water, the vane or support structures 14 are relieved as at 123. Furthermore, to reduce the possibility of eddy currents to a minimum, the apertures 15 or their equivalent, may be provided in the vanes.

Extending from and communicating with the bottom of the tank is a normally closed discharge or drain line 24 controlled by a valve 25. Positioned near the top of the tank is a waste or overflow outlet 26 which may be suitably connected to the waste line or may be connected to a hose. The area of the outlet 26 is greater than the cross sectional area of the intake because the latter supplies water under pressure and the former wastes the water by gravity. If desired, outlets 26 and the discharge from the valve 25 may be connected together.

The supply of water to the valve controlled conduit 21 may be furnished by a hand pump connected thereto by a hose, may be by a permanent pipe connected to a source of water supply subject to gravity pressure, or to a pump supply, the pump being power operable.

Extending upwardly and in the effective annular space between the side wall 10 of the container and the side 17 of the largest diameter milk can, are positioned a plurality of upwardly directed arcuate discharge conduits 27. The ends 28 thereof discharge water upwardly and tangentially, as it were, to the milk can side wall 17. Each of the conduits 27, as herein illustrated, terminates at a different level. Any reasonable number of the aforesaid arcuate conduits may be provided. Each communicates at its lower end with the distributing head 22. Preferably, these conduits have a spaced relation about the milk can and thus discharge upwardly and circuitously, as it were, upon and adjacent the milk exterior.

Conduits 27 and/or head 22 may be arranged to rotate if, as and when desired by suitable rearrangement of the parts mentioned, plus the addition of a water rotatable power member.

The lowermost jet or arcuate distributing conduit 27 is positioned in spaced relation to the bottom of the cooler and above the top of the vanes or supports 14. The uppermost jet preferably terminates about or slightly below the lower half of the container. It will be observed, therefore, that water under pressure which simultaneously issues from the several arcuate jets, progressively insures a circulatory movement of the water between the milk can exterior and the container interior and this water has a spiral like movement about the milk can exterior as it gradually works its way upwardly and finally discharges through the overflow or outlet 26. The swirling action obtained by means of the ports before mentioned, also secures a swirling action in the bottom of the container and this swirling action in part is carried upwardly in the annular column of water between the two containers, and such swirling action, therefore, is further accelerated by the directional discharge from the respective annularly and upwardly directed discharge conduits or jets 27. This spiraling column of water, as it were, is additionally accelerated from time to time, having reference to a particular portion of the water as the water moves upwardly and around the milk can, through the assistance of the successive directional discharges from the conduits 27. Of course, the communication between the distributing head and the supply pipe 21 through the container bottom is of any suitable or preferred fluid type arrangement.

The aforesaid spiraling action of the cooling medium (water) thus rapidly removes the heat from the milk can side 17 and, of course, the milk immediately adjacent thereto. As the milk immediately adjacent the side wall 17 and the bottom 18 of the milk can is cooled, it is displaced by warmer milk.

In the preferred form of the invention, such displacement is accelerated and positively insured by the addition of an agitating device, herein conventionally illustrated as a propeller 30 carried by a rotatable shaft 31.

Suitably secured to the container side wall 10 and extending upwardly therefrom is a standard 32 which terminates in a supporting plate 33 which has a hole 34 therein. An arm 36 is pivoted on the plate by the pivot bolt 35.

The standard 32 has a latch device 37 normally constrained toward seating position for seating in one of the notches 38 or 39. When the latch is seated in notch 38 the overhanging arm 36 lies above the container 10 and its free end registers with the opening 20 in the milk can. When the latch 37 is seated in either notch 39, the arm is swung at a suitable angular distance, herein shown as approximately 90°, and located in the non-interfering position. As shown clearly in Fig. 3, the arm support or plate 33 is formed that it does not interfere with the ready insertion or removal of the milk can.

The arm 36 supports a suitable motor device 40, herein shown as an electrical motor, and the same through a suitable reduction device, or the like, 41 is adapted to drive the vertical shaft 42, the latter having a detachable connection 43 with the agitator shaft 31.

To prevent the entrance of dirt, or the like, into the milk can while cooling, the shaft 31 may suitably support a perforated rubber closure 44 which is of greater area than the mouth 20 of the milk can, it being understood that in standard milk cans, the mouths of all capacities hereinbefore mentioned, have the same diameter. If desired, the shaft may support a suitable metallic closure which may nest in the milk can mouth or may have a depending flange exteriorly telescoping mouth of the milk can. In either of these last mentioned instances, as well as the former instance, the milk can cover structure preferably is held stationary by friction with the milk can and the shaft 31 rotates therein.

The operation of the device is as follows:

The agitator and its shaft 31 are detached as at 43 from the depending vertical power shaft 42 and the arm 36 is swung horizontally from the driving position to the inoperative position and latched therein. If the valve 22 has been previously opened and the water is overflowing through the outlet 26, the milk to be cooled is placed in the can of the desired size or capacity, which is inserted in the container and centered therein as previously described. The cooling action immediately starts and the spiraling circulatory action or path of travel of the water, previously described, is obtained and continues as long as valve 22 is opened or the milk can remains in the container. The arm 36 is swung into registering or driving position after the agitator and its shaft have been inserted into the can through the open mouth thereof and then the two shafts 31 and 42 are connected as at 43 with, of course, a suitable cover structure covering the mouths of the can. The agitator motor is then energized and the agitator accelerates the movement of the milk in the can to insure the more expeditious transfer of heat from the entire contents to the can so it can be dissipated or carried away by the overflowing water, such dissipation being accelerated by the directional movement of the water along the bottom of the can and the side wall thereof.

After the milk has been sufficiently cooled, the agitating motor is deenergized, the driving shaft 42 and agitator shaft 31 are disconnected and following this disconnection, the impeller and the shaft may, if desired, drop downwardly and rest on the bottom of the milk can. Thereafter, the arm 36 is swung to the inoperative position, the milk can with the agitator shaft removed from the container and another can placed in the container. Then the agitator shaft is transferred from the cooled can to the warm milk can, the arm returned to operative position, the shafts connected and the agitator motor energized.

The cycle may be repeated as often as desired. When the entire milking has been cooled, the valve 121 is closed and valve 25 is opened which drains the container.

While the invention has been described in great detail in the foregoing description, and several modifications of certain portions thereof have been set forth, it is to be understood that the aforesaid is illustrative and not restrictive in character, and the same merely describes the preferred and simplest form of the invention and the aforementioned modifications as well as others, such as the substitution of a water motor for an electric agitator motor, or other equivalent substitutions, and modifications which will readily suggest themselves to persons skilled in this art, all are considered to be within the broad scope of the invention, reference being had to the appended claims.

The invention claimed is:—

1. In a milk cooler, the combination with a container adapted to receive standard milk cans of different capacities having an area greater than the area of the largest size can and of a height less than the shortest can, means arranged to supply a cooling medium to the container near the bottom thereof, and spaced supports at the bottom and having a plurality of stepped shoulder portions arranged to locate and support any of the aforesaid cans in predetermined position in the container and prevent transverse movement therein.

2. A device as defined by claim 1, characterized by the spaced supports having their inwardly directed portions terminating appreciably short of meeting engagement to form a well therebetween.

3. A device as defined by claim 1, characterized by the spaced supports being apertured to reduce eddy currents.

4. A device as defined by claim 1, characterized by the spaced supports being apertured to reduce eddy currents and having their inwardly directed portions terminating appreciably short of meeting engagement to form a well therebetween.

5. In a milk cooler, the combination with a container adapted to receive standard milk cans of different capacities having an area greater than the area of the largest size can and of a height less than the shortest can, means arranged to supply a cooling medium to the container near the bottom thereof, and spaced supports at the bottom and having a plurality of stepped shoulder portions arranged to locate and support any of the aforesaid cans in predetermined position in the container and prevent transverse movement therein, said supply means distributing water upwardly, outwardly and in swirling relation upon the can bottom.

6. In a milk cooler, the combination with a container adapted to receive standard milk cans of different capacities having an area greater than the area of the largest size can and of a height less than the shortest can, means arranged to supply a cooling medium to the container near the bottom thereof, and spaced supports at the bottom and having a plurality of stepped shoulder portions arranged to locate and support any of the aforesaid cans in predetermined position in the container and prevent transverse movement therein, said supply means including a plurality of arcuately and upwardly directed discharge conduits arranged in spaced relation in juxtaposition to a milk can wall when the can is mounted in the container.

7. In a milk cooler, the combination with a container adapted to receive standard milk cans of different capacities having an area greater than the area of the largest size can and of a height less than the shortest can, means arranged to supply a cooling medium to the container near the bottom thereof, and spaced supports at the bottom and having a plurality of stepped shoulder portions arranged to locate and support any of the aforesaid cans in predetermined position in the container and prevent transverse movement therein, said supply means distributing water upwardly, outwardly and in swirling relation upon the can bottom, including a plurality of arcuately and upwardly directed discharge conduits arranged in spaced relation in juxtaposition to a milk can wall when the can is mounted in the container, said supports positioning all cans within the volume defined by the last mentioned discharge conduits.

8. In a milk cooler, the combination with a container, means arranged to supply a cooling medium to the container solely through the bottom thereof, and means supporting a milk can therein in spaced relation to the container side wall and bottom, said supply means distributing water upwardly, outwardly and in swirling relation upon the can bottom, and including a plurality of arcuately and upwardly directed discharge conduits arranged in spaced relation in juxtaposition to a milk can wall when the can is mounted in the container, the several discharge conduits being of dissimilar length and in succession discharging at successive levels in accordance with said lengths.

JOHN W. GOBLE.